United States Patent
Kolych et al.

(10) Patent No.: US 12,392,880 B2
(45) Date of Patent: Aug. 19, 2025

(54) OPTIMIZATION OF ENVIRONMENTAL SENSING IN WIRELESS NETWORKS

(71) Applicant: Cypress Semiconductor Corporation, San Jose, CA (US)

(72) Inventors: Igor Kolych, Lviv (UA); Kiran Uln, Pleasanton, CA (US)

(73) Assignee: Cypress Semiconductor Corporation, San Jose, CA (US)

(*) Notice: Subject to any disclaimer, the term of this patent is extended or adjusted under 35 U.S.C. 154(b) by 580 days.

(21) Appl. No.: 17/733,893

(22) Filed: Apr. 29, 2022

(65) Prior Publication Data

US 2023/0350042 A1  Nov. 2, 2023

(51) Int. Cl.
  *G01S 13/00* (2006.01)
  *G01S 7/00* (2006.01)

(52) U.S. Cl.
  CPC ............ *G01S 13/006* (2013.01); *G01S 7/006* (2013.01); *G01S 13/003* (2013.01)

(58) Field of Classification Search
  CPC ....... G01S 13/006; G01S 7/006; G01S 13/003
  See application file for complete search history.

(56) References Cited

U.S. PATENT DOCUMENTS

| | | | | |
|---|---|---|---|---|
| 2011/0273321 | A1* | 11/2011 | Joshi | G01S 13/003 342/27 |
| 2014/0152504 | A1* | 6/2014 | Kulaib | G01S 5/04 342/437 |
| 2018/0365975 | A1* | 12/2018 | Xu | G08B 29/185 |
| 2020/0191943 | A1* | 6/2020 | Wu | G01S 13/726 |
| 2021/0215789 | A1* | 7/2021 | Hu | G01S 7/415 |
| 2023/0157506 | A1* | 5/2023 | Tamino | G05D 1/0219 15/319 |

OTHER PUBLICATIONS

M. Nezafat, M. Kaveh and H. Tsuji, "Indoor Localization Using a Spatial Channel Signature Database," in IEEE Antennas and Wireless Propagation Letters, vol. 5, pp. 406-409, 2006, doi: 10.1109/LAWP.2006.883083 (Year: 2006).*

* cited by examiner

*Primary Examiner* — Marcus E Windrich

(57) ABSTRACT

Implementations disclosed describe techniques and systems for efficient estimation of spatial characteristics of an outside environment of a wireless device. The disclosed techniques include generating multiple covariance matrices (CMs) representative of obtained sensing values. Different CMs may be associated with different frequency increments used in sensing signals to probe the outside environment. The disclosed techniques may further include determining eigenvectors for the CMs, and identifying, based on the determined eigenvectors, one or more spatial characteristics of the object in the outside environment.

20 Claims, 9 Drawing Sheets

OPTIMIZATION OF ENVIRONMENTAL SENSING IN WIRELESS NETWORKS

TECHNICAL FIELD

The present disclosure pertains to wireless networks. More specifically, the present disclosure pertains to sensing of objects in an environment of a wireless device by detecting sensing signals that carry information about location of wireless devices. The present disclosure further pertains to fast and efficient extraction of such information from the detected signals.

BACKGROUND

Personal area networks, such as Bluetooth (BT), Bluetooth Low Energy (BLE), and wireless local area networks (WLAN), such as Wi-Fi networks and other networks operating under the IEEE 802.11 or other wireless standards, provide wireless connection for various personal industrial, scientific, and medical applications. Many BT, BLE, and IEEE 802.11 applications use identification and secure communications that are predicated on correct localization of various objects that carry a wireless device. For example, automotive applications deploy passive keyless entry systems that localizes a key fob and locks/unlocks/starts the car based on the proximity of the key fob to the car. Similarly, a tire pressure monitoring system identifies a specific tire whose pressure falls below a certain reading. BLE specification defines a variety of techniques for performing object localization, such as by estimating signal strength of received wireless signals (e.g., received signal strength indication, RSSI), angle (direction) of arrival (AoA) of wireless signals, high-accuracy distance measurements (HADM) using time-of-flight (ToF) channel sensing, phase-based ranging (PBR), and other techniques. AoA uses multiple sensors (antennas) that exploit differences in phases of one or more unmodulated tones arriving at the sensors (positioned at different points in space) to estimate the directions of the wave propagation. Similarly, channel sensing (e.g., HADM) estimates a distance to an object (e.g., another BLE device) by measuring phase delays accumulated by a plurality of signals of different frequencies along a path from an initiator wireless device to a return wireless device and back.

DETAILED DESCRIPTION

Figure 1:
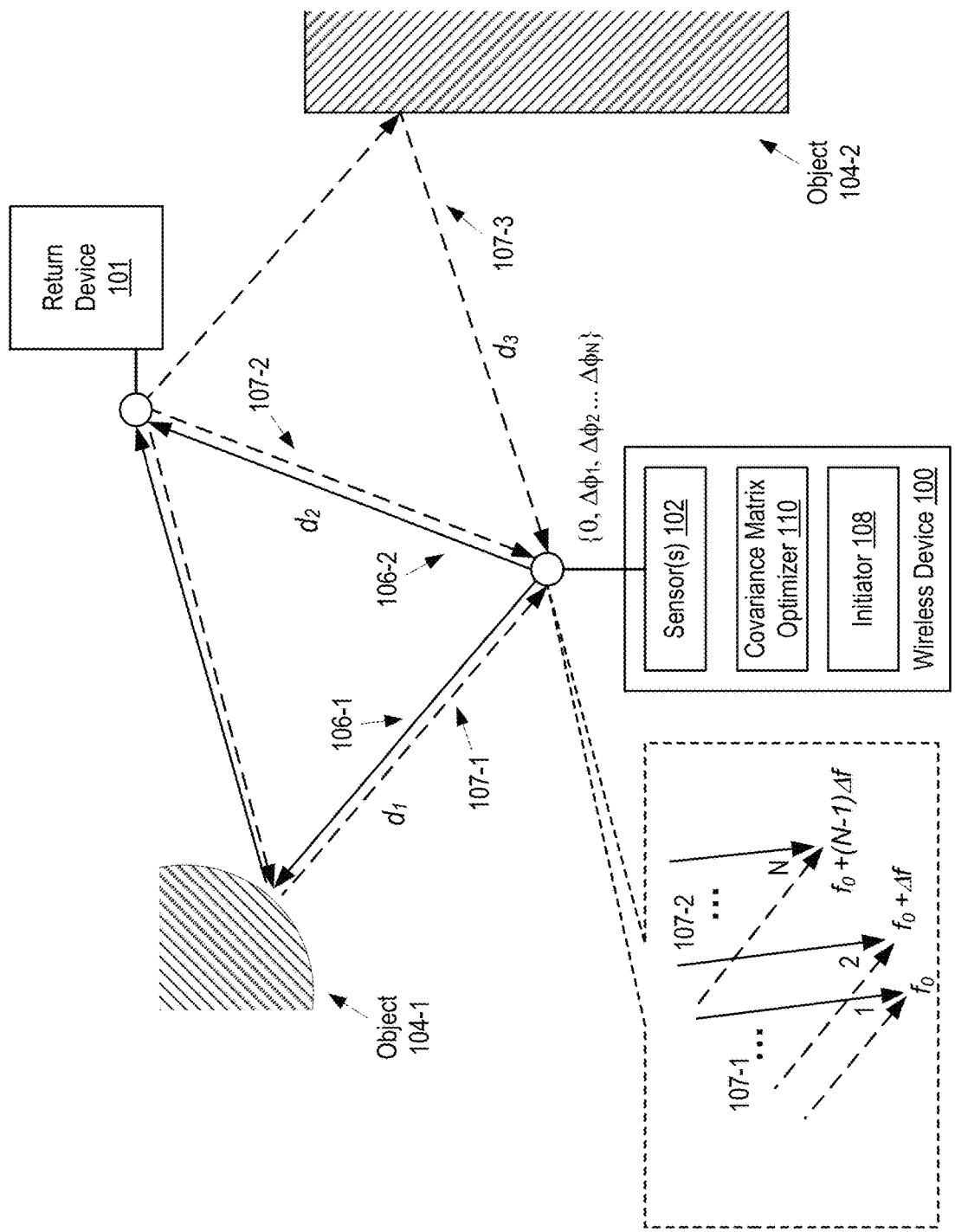
FIG. 1 illustrates one example setup for environment sensing by a wireless device, in accordance with some implementations.

Wireless environmental sensing, such as AoA or distance sensing, can require substantial processing resources. For example, during a sensing event, n waves can be detected as part of N sub-events. For example, in an instance of AoA estimation, each of N sub-events may include an arrival of a superposition of n waves at a corresponding one of N sensors (antennas) of a wireless device. For distance estimation, each of N sub-events may include a detection, by a single sensor (antenna), of n waves of a corresponding one of N sensing frequencies (tones). Each sub-event may include detecting a sensing value $r_j$ ($j \in [1, N]$) that is representative of the sum of all n waves received by the wireless device. Some of the n waves may be waves arriving from different objects while some of the n waves may be waves coming from the same object but along different paths. An accuracy of sensing increases with increasing the number of sensing sub-events N. A large number N ensures a higher accuracy of AoA or distance determination but, generally, requires a number of processing operations that scales as $O(N^2)$, which represents the size of the covariance matrix constructed with N sensing values: $R_{jl} = \langle r_j r_l^* \rangle$, where the angular brackets $\langle \ldots \rangle$ denote statistical (e.g., time) averaging and x* stands for complex conjugation. An additional (N× n) steering matrix Â is defined (e.g., computed) that relates the amplitudes and phases of n incoming waves to N sensing values. Estimation of the AoA of the incoming waves or a distance to an object (herein collectively referred to as spatial characteristics) may then be performed by computing N eigenvectors of the covariance matrix $R_{jl}$ (herein also denoted as R̂), and identifying N−n eigenvectors (and commonly referred to as noise space eigenvectors) that are expected to be orthogonal to the steering matrix Â. Subsequently, a localization vector is constructed that evaluates how much the noise space eigenvectors are non-orthogonal to the steering matrix and whose optimization provides an estimate of the angles of arrival $\theta_k$ of various detected waves or distances $d_k$ to various objects in the environment. Computing a large number of eigenvectors and optimizing the localization vector can exceed computational resources of low-power microprocessor devices used in automotive applications, Internet-of-Things applications, sensing and monitoring applications, and the like.

Aspects and implementations of the present disclosure address these and other limitations of the existing technology by enabling systems and methods of efficient use of covariance matrices and optimization of the localization vector(s) to achieve fast, accurate, and computationally inexpensive estimation of various spatial characteristic of an environment of wireless systems and devices. Numerous implementations are disclosed herein that deploy smoothed representations of sensing values that significantly reduce the amount of computations needed to estimate various spatial characteristics of the environment without degrading the accuracy of the estimation. For example, an N×N covariance matrix, which requires for its determination $O(N^2)$ processing operations, may be sampled to produce m smoothed $(N/s) \times (N/s)$ covariance matrices, which need only $O(N^2 m/s^2)$ processing operations. In particular, if m=s=2, the amount of computations may be reduced by roughly a factor of two. Advantages of the disclosed implementations may include, without limitations, computationally efficient environmental sensing that is capable of being used for fast real-time monitoring of the changes in the environment, e.g., one or more wireless devices moving with respect to the environment that includes other wireless devices and various additional objects.

FIG. 1 illustrates one example setup for environment sensing by a wireless device, in accordance with some implementations. A wireless device 100 may be any BT device, BLE device, WLAN (e.g., Wi-Fi) device, or any other type of a device capable of generating, transmitting, receiving, and processing electromagnetic sensing signals. In some implementations, the sensing signals may be radio signals in the 2.4 GHz band, 5 GHz band, 60 GHz band, or any other radio communication band. In some implementations, sensing signals may be compatible with one or more IEEE 802.11 wireless standards. Wireless device 100 may include one or more sensors 102 capable of transmitting and receiving sensing signals. Sensors 102 may include or be communicatively coupled to one or more antennas, such as dipole antennas, loop antennas, multiple-input multiple-output (MIMO) antennas, antenna arrays, or any other type of devices capable of receiving and transmitting electromagnetic signals. The environment of wireless device 100 may include a return device 101, which may be another wireless device capable of receiving and transmitting wireless signals, and one or more objects, e.g., object 104-1, object 104-2, and so on, which may be walls, cars, pieces of furniture, and other objects that reflect wireless signals.

Wireless device 100 may generate and transmit a plurality of sensing signals. In some implementations, the sensing signals may have the same frequencies (e.g., in the instances of AoA sensing). In some implementations, the sensing signals may have different frequencies (e.g., tones), for example, in the instances of distance sensing. In the following, operations of environmental sensing will be illustrated using distance sensing as an example, but it should be understood that similar techniques may be used for other types of sensing including, without limitation, AoA sensing and velocity sensing. More specifically, wireless device 100 may generate and transmit a sensing signal, which may propagate along multiple paths, e.g., 106-1 and 106-2. The signal may include multiple (e.g., n) tones, e.g., $f_0$, $f_0+\Delta f_1$, $f_0+\Delta f_2$ . . . , and may be transmitted towards a return device 101, which may be a responding device belonging to the same wireless network as the wireless device 100. The responding device may evaluate phase information of the received signal and include this phase information in the returned signal, indicated as propagated along return paths 107-1, 107-2, and 107-3. Each tone of the transmitted signal (and, correspondingly, of the returned signal) may carry its own phase information. In particular, the total phase change $\Delta \phi$ associated with the distance $d_1$ traveled by each signal of frequency f between wireless device 100 and return device 101 (including reflection from object 104-1) is $\Delta \phi = 4 \pi f d_1 / c$, where c is the speed of light. The callout portion of FIG. 1 illustrates schematically a composition of the returned signal (illustrated with dashed lines) received from return device 101. Signals propagating along various return paths may carry phase information representative of the respective paths, e.g., signals traveled over paths 106-1 and 107-1 may carry information about distance $d_1$, signals traveled over paths 106-2 and 107-2 may carry phase information about the distance $d_2$, and signal 107-3 may carry information about distance $d_3$.

A detection event initiated by initiator 108 of wireless device 100 may include transmitting N sensing signals and then detecting N received signals (sensing values), each with a different frequency $f_j$. Each of the detected sensing values $r_j$ may characterize a superposition of waves propagating along n paths; some (or all) of the paths may include one or more reflections:

$$r_j = \left( \sum_{k=1}^{n} a_j(d_k) S_k + n_j \right) \left( \sum_{l=1}^{n} a_j^*(d_l) S_l^* + n_j' \right) j \in [1, N],$$

where $S_k$ represents the amplitude of the wave traveled over k-th path, $n_j$ is the noise associated with forward propagation (and detection) of j-th frequency (tone, channel) $f_j$, $n_j'$ is the noise associated with backward propagation (and detection) of j-th frequency, and $a_j(d)$ is a steering vector (also denoted, in vector notations, as â (d)) that describes phase change over distance d, which may take one of the values $d = d_1 \ldots d_n$. In particular, for N equidistant sensing tones, $f_j = f_0 + (j-1) \Delta f$, the steering vector may have the form, $a_j(d) = \exp[4\pi i (j-1) \Delta f_d / c]$.

In MUSIC algorithm implementations, sensing values may be used to construct the N×N covariance matrix, $R_{ji} = \langle r_j r_i^* \rangle$, where the angular brackets $\langle \ldots \rangle$ denote statistical averaging and $r_i^*$ stands for complex conjugation of $r_i^*$. In some implementations, covariance matrix may be formed using square roots (with suitably chosen sign value) of sensing values, e.g., $R_{ji} = \langle \sqrt{r_j} \sqrt{r_i^*} \rangle$. In some implementations, statistical averaging may be performed using smoothing in the frequency domain, e.g., using smooth-MUSIC algorithm. In some implementations, statistical averaging may include averaging in the time domain, e.g., by collecting multiple instances of data. In some implementations, time averaging is not performed. For uncorrelated noise, $\langle n_j n_i^* \rangle = \delta_{ji} \sigma^2$, where $\sigma^2$ is the noise variance in a single sensing channel.

Covariance matrix $\hat{R}$ may have n signal eigenvectors $\hat{s}_{(1)} \ldots \hat{s}_{(n)}$ and N−n noise eigenvectors $\hat{g}_{(n+1)} \ldots \hat{g}_{(N)}$ (which define what is commonly referred to as the noise subspace). For uncorrelated noise, noise eigenvectors are orthogonal to the steering vector: $\hat{a}^\dagger(d_m) \cdot \hat{g}_{(\alpha)} = 0$, where subscript α enumerates various eigenvectors. Accordingly, the localization vector P(d) (often referred to in MUSIC and GCC applications as the pseudo-spectrum), defined using noise eigenvectors as, $$P^{-1}(d) = \sum_{\alpha=n+1}^{N} |\hat{a}^\dagger(d) \cdot \hat{g}_{(\alpha)}|^2$$

has maxima for the actual distances $d = d_1 \ldots d_n$ of signal propagation, some of which may correspond to direct (line-of-sight) signal propagation and some may correspond to paths that include at least one reflection. In some implementations, the localization vector may be defined using signal eigenvectors, e.g., as $$P(d) = \sum_{\alpha=1}^{N} \lambda_{(\alpha)} |\hat{a}^\dagger(d) \cdot \hat{s}_{(\alpha)}|^2,$$

where $\lambda_{(\alpha)}$ is the eigenvalue corresponding to signal eigenvector $\hat{s}_{(\alpha)}$.

The above example of the MUSIC localization vector is intended to be illustrative. In various implementations, the localization vector P(d) may be obtained using different procedures. For example, in the GCC method, the localization vector may be defined as, $$P(d) = \left| \sum_{j=1}^{N} a_j^*(d) r_j \right|^2.$$

This vector may similarly have maxima for the actual distances $d=d_1 \ldots d_n$, and may be computed using Inverse Fast Fourier algorithm techniques. Numerous other ways of defining the localization vector P(d) are also within the scope of the present disclosure.

Figure 2:
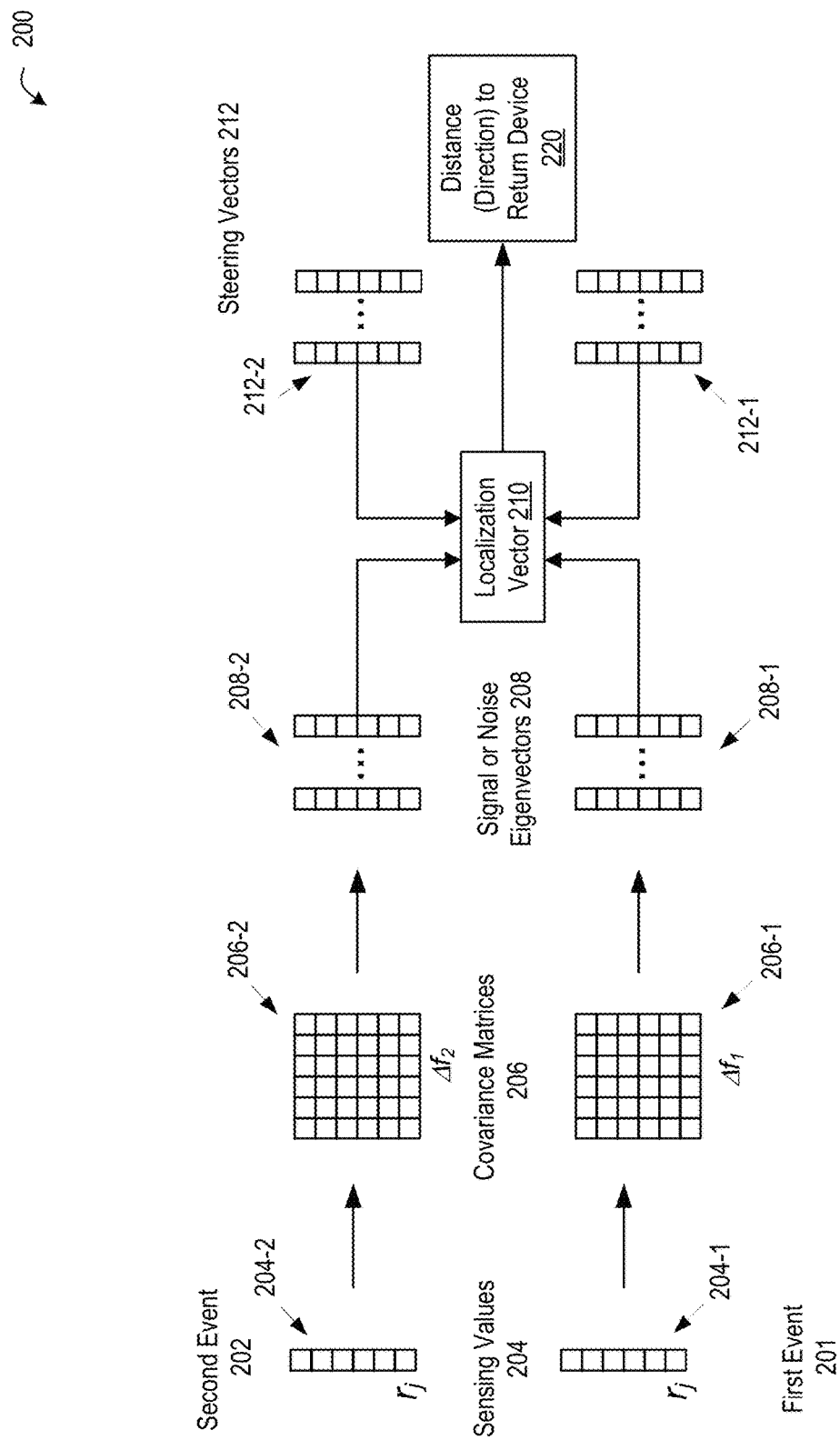
FIG. 2 illustrates example operations of a covariance matrix optimizer for efficient estimation of spatial characteristics of an environment of a wireless device, in accordance with some implementations.

FIG. 2 illustrates example operations 200 of covariance matrix optimizer 110 for efficient estimation of spatial characteristics of an environment of a wireless device, in accordance with some implementations. As illustrated, in FIG. 2, separate sets of sensing values 204 may be detected during or in conjunction with separate (sensing) events, e.g., sensing values 204-1 may be detected during first event 201, sensing values 204-2 may be detected during second event 202, and so on (further sensing events are not shown). Covariance matrixes 206 may be formed from corresponding sensing values 204 and may represent an outer matrix product of the sensing values. In particular, covariance matrix 206-1 may be formed from sensing values 204-1 and covariance matrix 206-2 may be formed from sensing values 204-2, and so on. Depicted in FIG. 2 is an example of N=6 different sensing values, each corresponding to a different frequency, but any other number of frequencies may be used.

Processing of sensing data that includes a plurality of events with different frequency increments $\Delta f_1$, $\Delta f_2$, etc., may be performed as follows. Covariance matrix 206-1 may be associated with frequency increment $\Delta f_1$ (the first event), covariance matrix 206-2 may be associated with frequency increment $\Delta f_2$ (the second event), and so on. Separate sets of eigenvectors 208 may be determined for different sensing events. For example, eigenvectors 208-1 may be determined for the first event, eigenvectors 208-2 may be determined for the second event 208-2, and so on. Eigenvectors 208 may be signal eigenvectors or noise eigenvectors, depending on the specific implementation, as described above. The localization vector 210 may then be constructed using steering vectors 212, e.g., steering vectors 212-1 may be constructed for the first event, steering vectors 212-2 may be constructed for the second event, and so on. The steering vectors may have the same functional form but may be different for different events, as a result of depending on different frequency increments. As indicated with block 220, distances $d_k$ to the return device along various paths of signal propagation (and, in some implementations, directions $\theta_k$ of such paths) may then be determined by maximizing the localization vector P(d).

Figure 3:
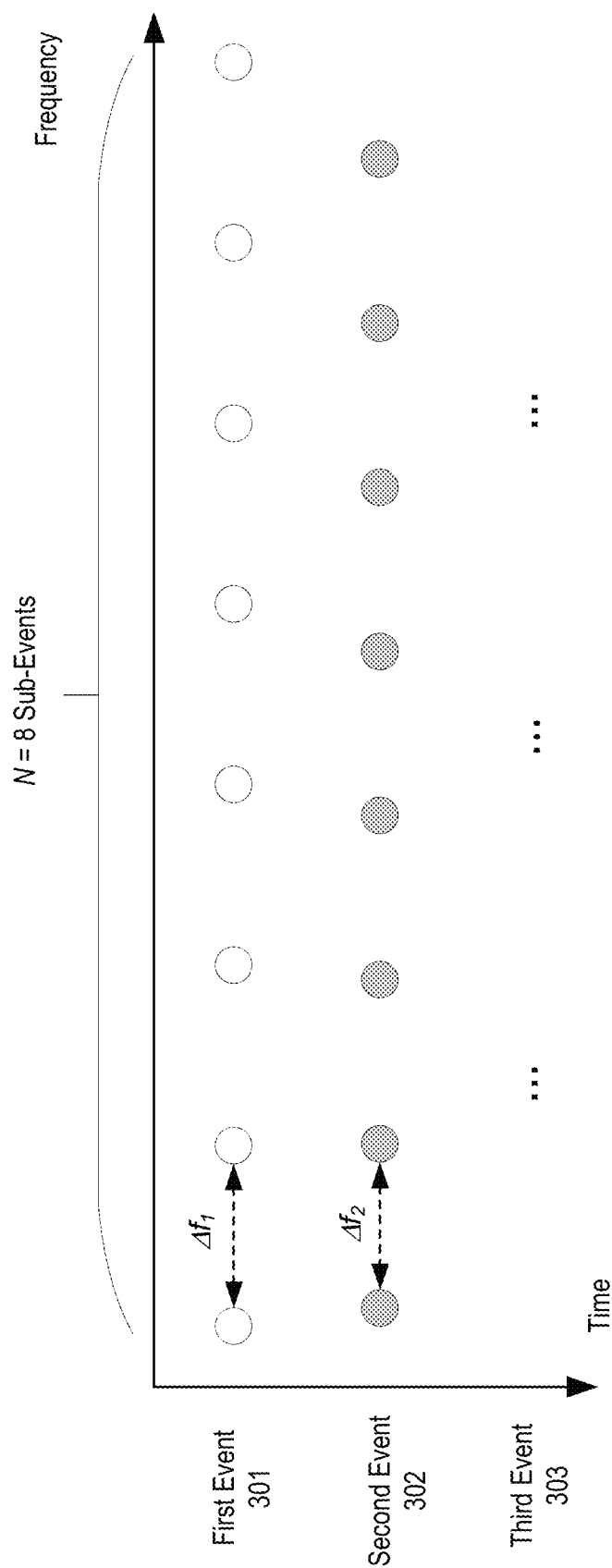
FIG. 3 illustrated schematically two sensing events, each event having N=8 sub-events.

FIG. 3 illustrates schematically two sensing events, a first sensing event 301 and a second sensing event 302, both events having N=8 sub-events. The first event 301 may include tones (channels) with a first frequency increment $\Delta f_1$=11 MHz, e.g., with the first tone having frequency 2402 MHz and the last tone having frequency 2479 MHz (or any other suitable values). The second event 302 may include tones with the second frequency increment $\Delta f_2$=10 MHz, e.g., with the first tone having frequency 2403 MHz and the last tone having frequency 2473 MHZ (or any other suitable values). The horizontal axis depicts the selected tones within an available range of frequencies (e.g., 2400 MHz to 2483.5 MHz for BT, which operates in the 2.4 GHz ISM band) and the vertical axis depicts the flow of time. Generally, sensing events that have a larger frequency range have a higher accuracy of distance estimation whereas events that have a finer frequency spacing enable detection of longer ranges (distances). For example, the first event 301, which spans 78 MHz interval, may allow higher accuracy of distance detection compared with the second event 302, which spans 71 MHz interval. On the other hand, the second event 302, which has a smaller frequency increment, may enable resolving larger distances compared with the first event 301. Correspondingly, it may be advantageous to include data from events that have different distributions of tones. Detection of each of N transmitted (and received) tones represents a corresponding sensing sub-event j that generates a respective sensing value $r_j$, which is used to construct the covariance matrix, as described below. Each frequency increment $\Delta f$ may translate into the corresponding phase increment $\Delta \phi = 4\pi \Delta f d_k/c$. It should be understood that the example of N=8 tones (and the same number of sensing sub-events) is intended as an illustration and that the actual number of tones used in various implementations may be different (e.g., greater or smaller than 8). In the instances of AoA estimation, an event may include N sub-events, each sub-event corresponding to arrival of sensing signals (e.g., from all objects in the environment) at a respective one of N detectors of a sensing array. Although two sensing events are explicitly illustrated in FIG. 3, a third sensing event 303, or any number of additional sensing events may be used.

In the implementation described above, the localization vector for a combination of events is the harmonic mean of the evaluation measures computed for each event, $P=P_1^{-1}+P_2^{-1}+\ldots$. In some implementations, the localization vector for a combination of events may instead be a sum of localization vectors computed for each event, $=P_1+P_2+\ldots$, a product of localization vectors computed for each event, or any other suitable localization vectors. In some implementations, e.g., where different sensing events have unequal number of sub-events, the localization vectors computed for individual events may be weighed with suitably chosen weights, e.g., weights proportional to the number of sub-events in each sensing event, weights that are empirically determined, and so on.

Figure 4:
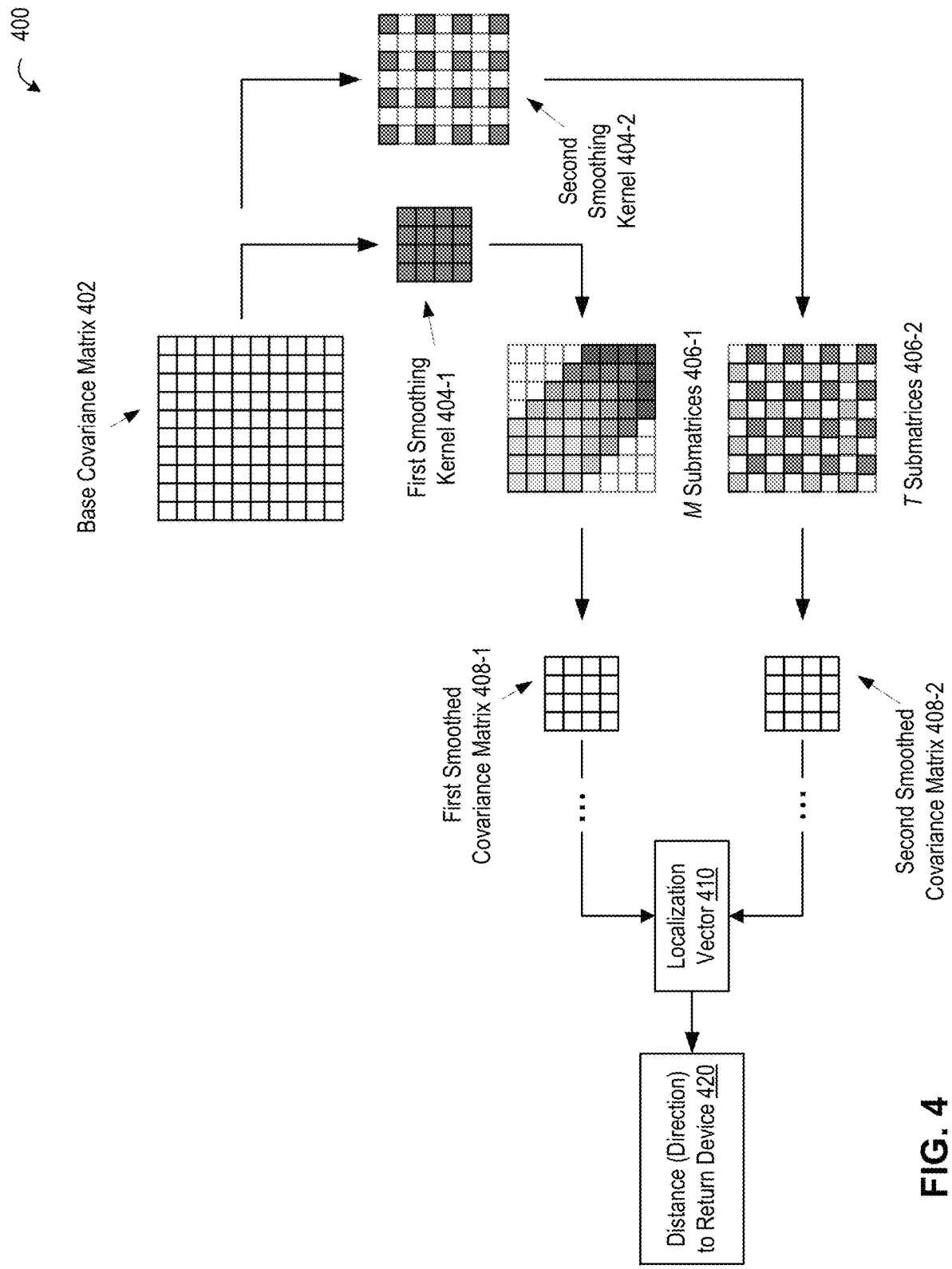
FIG. 4 illustrates example smoothed matrix operations of a covariance matrix optimizer for efficient estimation of spatial characteristics of an environment of a wireless device, in accordance with some implementations.

FIG. 4 illustrates example smoothed matrix operations 400 of covariance matrix optimizer 110 for efficient estimation of spatial characteristics of an environment of a wireless device, in accordance with some implementations. In some implementations, a large N×N covariance matrix may be sampled to generate one or more submatrices of a smaller size, e.g., (N/s)×(N/s), thus reducing the amount of computations while still representing well the geometry of the environment. The submatrices may be sampled using a number of different kernels and then smoothed, using the smooth-MUSIC algorithm.

A first smoothing kernel 404-1 may be associated with the frequency increment $\Delta f$, which may be the spacing between the adjacent tones of a sensing event, e.g., $\Delta f=10$ MHz, and may be used to sample contiguous (N/s)×(N/s) blocks of the base covariance matrix 402. A second smoothing kernel 404-2 may be associated with a different frequency increment, e.g., $2\Delta f=20$ MHz, and may be used to sample non-contiguous (N/s')×(N/s') blocks of the base covariance matrix 402.

As illustrated in FIG. 4, the number M of submatrices 406-1 sampled with first smoothing kernel 404-1 may be different from the number T of submatrices 406-2 sampled with second smoothing kernel 404-2. Although FIG. 4 depicts application of two kernels, any other number of kernels may be used to sample the elements of base covariance matrix 402.

The smooth-MUSIC algorithm may then be applied to the set of submatrices (e.g., submatrices 406-1, submatrices 406-2, etc.) to obtain respective smoothed covariance matrices, e.g., first smoothed covariance matrix 408-1, second smoothed covariance matrix 408-2, and so on. In some implementations, the first and the second smoothed covariance matrices may have the same size (s=s'), e.g., as illustrated in FIG. 4. In some implementations, the first and the second smoothed covariance matrices may have different sizes (s≠s'), which may depend on the size of smoothing kernels being used. In various implementations, any number of smoothed matrices of arbitrary sizes may be sampled. For example, a third smoothed covariance matrix may be sampled from elements of base covariance matrix 402 that are associated with larger frequency increments, e.g., $3\Delta f$, $4\Delta f$, etc.

Smoothed covariance matrices 408-$n$ may be used to estimate spatial localization of the responding device(s) in substantially the same way as described in relation to covariance matrices 206-$n$ of FIG. 2. A localization vector 410 may be constructed using steering vectors for the smoothed covariance matrices 408-$n$. As indicated schematically with ellipses, constructing localization vector 410 using smoothed covariance matrices 408-$n$ may include additional operations described above in conjunction with FIG. 2, which may include determining signal or noise eigenvectors, computing eigenvalues of the smoothed covariance matrixes, computing steering vectors for the smoothed covariance matrices, computing dot products of the signal or noise eigenvectors and the steering vectors, adding contributions from multiple eigenvectors, and the like. Based on the localization vector 410, various spatial characteristics of the return device(s), such as distances $d_k$ to the return device 420 along various paths of signal propagation (and, in some implementations, directions $\theta_k$ of such paths) may then be determined, e.g., by identifying extrema of the localization vector 416.

In some implementations, additional smoothed covariance matrices may be sampled and used for further improvement of the accuracy and/or the maximum range. In some implementations, e.g., where accuracy is of more importance than the maximum range, the first sparse covariance matrix may be associated with a larger increment (e.g., $2\Delta f$) and the second sparse covariance matrix may be associated with a smaller increment (e.g., $\Delta f$).

Figure 5A:
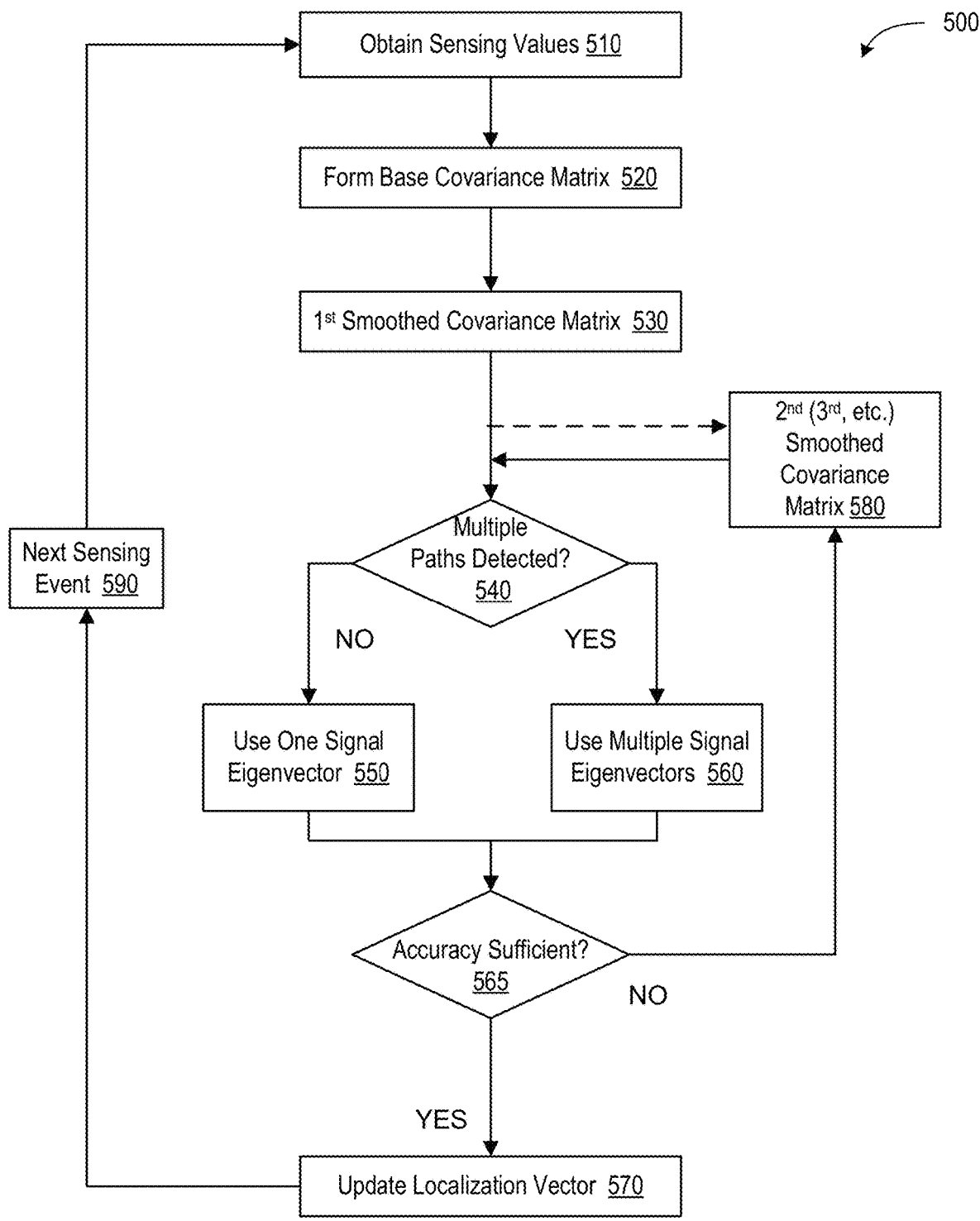
FIG. 5A and FIG. 5B illustrate an example flow of operations during efficient estimation of geometric characteristics of an environment of a wireless device, in accordance with some implementations.
Figure 5B:
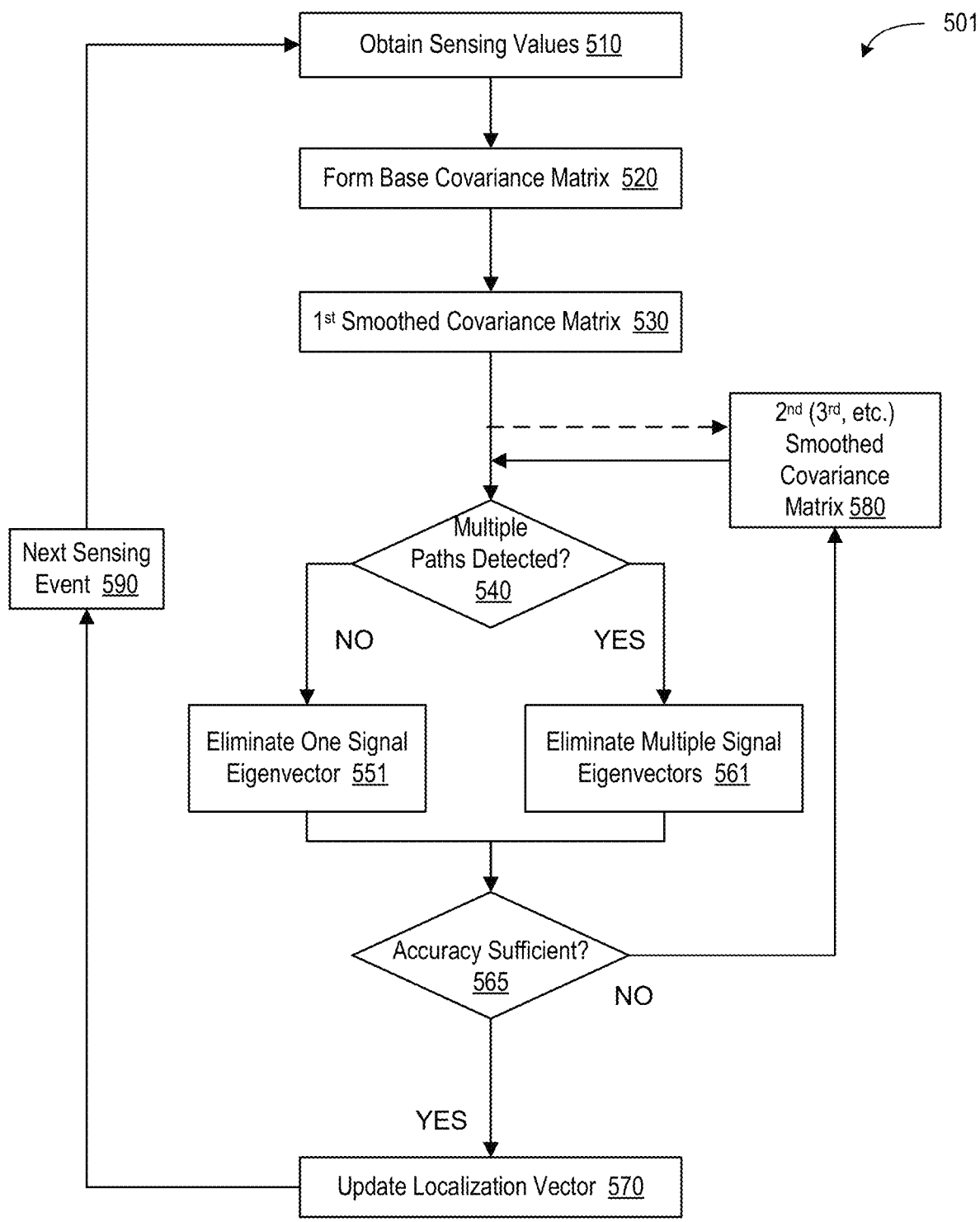

FIG. 5A and FIG. 5B illustrate an example flow of operations 500 and 501 during efficient estimation of geometric characteristics of an environment of a wireless device, in accordance with some implementations. Operations 500 may use one or more sensing events for determination of various geometric characteristics of the environment, e.g., distances to one or more wireless devices, directions to the wireless devices, and the like. Blocks 510-590 may be performed as part of a single sensing event and further repeated for subsequent sensing events. A sensing event may include transmitting, by a wireless device, a plurality of sensing signals and receiving signals returned by various other wireless devices. Sensing values representative of the amplitude and phase of the reflected signals may be obtained (block 510), e.g., from IQ data for each of $N_0$ tones of the transmitted and returned signals. A base covariance matrix, with a size $N_0 \times N_0$, may then be formed (block 520). As indicated with box 530, the base covariance matrix may be smoothed using a first smoothing kernel to obtain a first smoothed covariance matrix, which may have the reduced size N×N, with $N<N_0$. In some implementations, the first sparse covariance matrix may be built using N/s contiguous columns and rows associated with the lowest frequency increment used during the sensing event, e.g., 10 MHz, 5 MHz, or any other suitable increment.

At block 540, the wireless device may identify whether multiple paths of signal propagation exist in the environment of the wireless device. This may be performed by classifying N eigenvectors of a covariance matrix (e.g., one of covariance matrices 206-$n$ or one of sparse covariance matrices 408-$n$) into n signal eigenvectors $\hat{s}_{(1)} \ldots \hat{s}_{(n)}$ and N–n noise eigenvectors $\hat{g}_{(n+1)} \ldots \hat{g}_{(N)}$ using one of the techniques described below. In particular, in some instances, a direct line-of-sight path may exists between the wireless device and an object (another wireless device) located in the environment. The existence of the line-of-sight may be based on the historical data for the current environment, e.g., distances determined based on previous sensing events. For example, in the simplest scenario, the environment may include one return device that is in the direct line-of-sight from the wireless device with no multiple reflections (e.g., of the type illustrated in FIG. 1 with paths 106-1, 107-1, and 107-3). This corresponds to a situation of the one-dimensional signal space (n=1) and the N–1-dimensional noise space. In some implementations, direct line-of-sight environments may be identified based on the eigenvalues of the covariance matrices (or sparse covariance matrices). For example, in a direct line-of-sight environment, the largest eigenvalue $\lambda_{(1)}$ associated with the signal eigenvector $\hat{s}_{(1)}$ may be significantly larger than the remaining eigenvalues $\lambda_{(2)} \ldots \lambda_{(N)}$ associated with noise eigenvectors $\hat{g}_{(2)} \ldots \hat{g}_{(N)}$. In implementations where the localization vector P(d) is obtained using signal eigenvectors, as illustrated in FIG. 5A, one signal eigenvector, e.g., $\hat{s}_{(1)}$, may then be used (block 550) for determining the localization vector P(d). In some instances, it may be determined that the environment has multiple paths to (and/or from) the return device. For example, n eigenvalues $\lambda_{(1)} \ldots \lambda_{(n)}$ may be substantially larger than some characteristic value associated with noise (e.g., determined empirically, via controlled testing). In such situations, n corresponding signal eigenvectors $\hat{s}_{(1)} \ldots \hat{s}_{(n)}$ may be used (block 560) to obtain the localization vector P(d).

As illustrated in FIG. 5B, in implementations where the localization vector P(d) (or $P^{-1}(d)$) is obtained using noise eigenvectors, once it has been determined (at block 540) that a single line-of-sight path is present (e.g., based on the existence of a single eigenvalue $\lambda_{(1)}$ above the characteristic value), one signal eigenvector $\hat{s}_{(1)}$ may be eliminated and the localization vector P(d) may be obtained using (block 551) noise eigenvectors $\hat{g}_{(2)} \ldots \hat{g}_{(N)}$. In those instances where multiple, e.g., n, paths are detected (e.g., based on the existence of multiple eigenvalues $\lambda_{(1)} \ldots \lambda_{(n)}$ above the characteristic value), the corresponding number of signal eigenvectors $\hat{s}_{(1)} \ldots \hat{s}_{(n)}$ may be eliminated (block 562) and the localization vector P(d) may be obtained using the remaining noise eigenvectors $\hat{g}_{(n+1)} \ldots \hat{g}_{(N)}$.

Although the existence of a multipath signal propagation may be detected, as described above, by comparing various eigenvalues $\lambda_{(1)} \ldots \lambda_{(N)}$ to each other and/or to some characteristic value(s), in some implementations, other methods of detection of multipath propagation may be deployed. For example, various methods of tracking may be used, which may include estimating the dynamics of the localization vector P(d) (the change of the localization vector with time, e.g., between different sensing events) using one or more models of motion of the return object, such as a constant velocity model, a constant acceleration model, etc. Such modeling may further include any suitable filtering, e.g., Kalman filtering. The models may predict the localization vector P(d) for subsequent sensing events. The difference between the predicted localization vector and the measured localization vector may be processed using methods of statistical analysis. If the difference is Gaussian, such a difference may be attributed to the noise as consistent with single-path signal propagation. If the difference is non-Gaussian (e.g., bimodal, etc.), such a difference may be attributed to a multipath propagation.

Referring now to both FIG. 5A and FIG. 5B, in some implementations, the localization vector computed using a single smoothed covariance matrix (e.g., matrix 408-1) may ensure a sufficient (target) accuracy of distance determination (block 565). For example, if the relative error $\Delta d/d$ is within a target range (e.g., at or below 20%, 10%, etc.), the wireless device may update (at block 570) the localization vector with the newly computed value. For example, if the sparse covariance matrix is the first matrix used to compute the localization vector, the first computed value $P_1(d)$ may be stored as the current value of the localization vector $P_1(d) \rightarrow P(d)$.

In those instances where the relative error $\Delta d/d$ exceeds a threshold value, the wireless device may improve accuracy by resampling the base covariance matrix (e.g., as described above in conjunction with FIG. 4) and obtaining a second smoothed covariance matrix (block 580). In some implementations, the second smoothed covariance matrix may be associated with a frequency increment that is larger than the increment $\Delta f$ for the first smoothed covariance matrix. For example, the increment for the second smoothed covariance matrix may be a multiple of $\Delta f$, e.g., may be $2\Delta f$, $3\Delta f$, $4\Delta f$ etc. The first smoothed covariance matrix (smaller frequency increment) may be capable of distinguishing distance(s) of a higher maximum range whereas the second covariance matrix (larger frequency increment) may be capable of providing estimates of a higher accuracy. The second smoothed covariance matrix may be processed (blocks 540-560) similarly to how the first smoothed covariance matrix was processed. The computed value $P_2(d)$ may then be used to update (block 570) the current localization vector, e.g., as $P(d)+P_2(d) \rightarrow P(d)$. The process of updating the localization vector (e.g., using the third, fourth, etc.) smoothed covariance matrices may continue until the target accuracy $\Delta d/d$ is reached or a certain predetermined number of smoothed covariance matrices has been used. In some implementations, the first smoothed covariance matrix may have a larger increment (e.g., $2\Delta f$) than the increment (e.g., $\Delta f$) of the second smoothed covariance matrix.

In some implementations, the accuracy (or the relative error $\Delta d/d$) may be estimated based on the amount of noise in the environment. For example, the relative error may be estimated based on the size of noise eigenvalues, e.g., based on a sum of all noise eigenvalues or a subset of noise eigenvalues. In some implementations, the value of the localization vector P(d) at the maximum may be used, with higher values $P_{max}$ indicative of lesser noise and, correspondingly, higher accuracy, and lower values $P_{max}$ indicative of greater noise and, correspondingly, lower accuracy. In some implementations, the accuracy may be estimated based on RSSI of the returned signals. In some implementations, dynamic estimation of the accuracy is not performed and the number of smoothed matrices being sampled is determined based on the accuracy requirements for a particular domain-specific application that is being used. In such implementations, the assessment of accuracy (block 565) may be performed prior to the block 540, e.g., as part of the application initialization, which may determine the desired number of smoothed matrices to be sampled as part of various sensing events.

After completion of the computations of the current sensing event, the wireless device may repeat blocks 510-580 as part of the next sensing event (block 590). In some implementations, different sensing events may use the same tones, e.g., tones spaced with $\Delta f=11$ MHz or $\Delta f=10$ MHz. In some implementations, different sensing events may use different tones, e.g., odd-numbered sensing events may used tones spaced with $\Delta f=11$ MHz whereas even-numbered sensing events may use tones spaced differently, e.g., $\Delta f=10$ MHz or $\Delta f=9$ MHz.

Figure 6A:
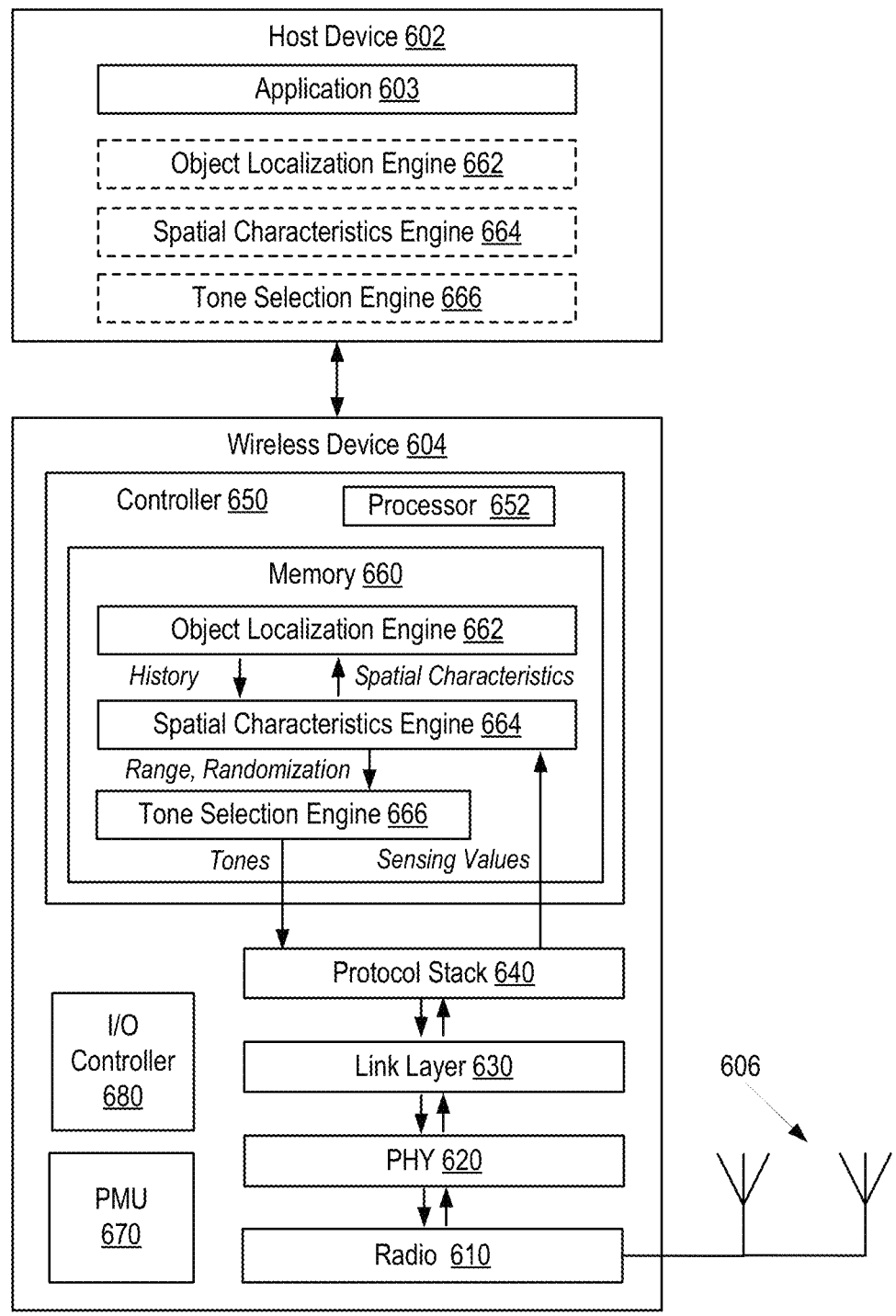
FIG. 6A illustrates one example implementation of a wireless system capable of supporting efficient estimation of spatial characteristics of an environment for fast and precise localization of objects, in accordance with some implementations.

FIG. 6A illustrates one exemplary implementation of a wireless system 600 capable of supporting efficient estimation of spatial characteristics of an environment for fast and precise localization of objects, in accordance with some implementations. Wireless system 600 may be a BT network, a BLE network, or any other type of a wireless network (e.g., personal area network). Wireless system 600 may include any number of host devices 602 (one host device is depicted for conciseness). A host device 602 may be any desktop computer, laptop computer, tablet, phone, smart TV, sensor, appliance, system controller (e.g., an air conditioning, heating, water heating controller), component of a security system, medical testing or monitoring equipment, automotive equipment, or any other type of a device. Host device 602 may be coupled (e.g., via a wired connection) to a respective wireless device 604. For brevity, shown is a single wireless device 604, but it should be understood that host device 602 may be coupled to any number of such wireless devices, e.g., a BLE wireless device and a Zigbee® wireless device. In some implementations, wireless device 604 may be implemented as an integrated circuit (IC) device (e.g., disposed on a single semiconductor die). In some implementations, various modules and components may be absent or shared between multiple wireless devices coupled to the host device (e.g., antenna(s) 606 and/or processor 652 may be shared among multiple wireless devices).

Wireless device 604 may use one or more antennas 606 to receive and transmit radio waves. A signal received by antenna(s) 606 may be processed by radio 610 which may include filters (e.g., band-pass filters), low-noise radio-frequency amplifiers, down-conversion mixer(s), intermediate-frequency amplifiers, analog-to-digital converters, inverse Fourier transform modules, deparsing modules, interleavers, error correction modules, scramblers, and other (analog and/or digital) circuitry that may be used to process modulated signals received by antenna(s) 606. Radio 610 may further include a tone (frequency) generator to generate radio signals at selected tones. Radio 610 may also include antenna control circuits to control access to one or more antennas 606, including switching between antennas. Radio 610 may additionally include radio control circuits, such as phase measurement circuits and a tone selector circuit. The phase measurement circuits can perform phase measurements on received signals, e.g., IQ decomposition, which may include measuring a phase difference between the received signal and a local oscillator signal. The tone selector circuit can select tones for transmission.

Radio 610 may provide the received (and digitized) signals to a PHY 620 components. PHY 620 may support one or more operation modes, e.g., BLE operation modes. Although one PHY 620 is shown, any suitable number of PHY layers (supporting a respective number of operation modes) may be present. PHY 620 may convert the digitized signals received from radio 610 into frames that can be fed into a Link Layer 630. Link Layer 630 may have a number of states, such as advertising, scanning, initiating, connection, standby. Link Layer 630 may transform frames into data packets. During transmission, data processing may occur in the opposite direction, with Link Layer 630 transforming data packets into frames that are then transformed by PHY 620 into digital signals provided to radio 610. Radio 610 may convert digital signals into radio signals and transmit the radio signals using antenna(s) 606. In some implementations, radio 610, PHY 620, and Link Layer 630 may be implemented as parts of a single integrated circuit.

Wireless device 604 may include a protocol stack 640. The protocol stack 640 may include a number of protocols, e.g., Logical Link Control Adaptation Protocol (L2CAP), which may perform segmentation and reassembly of data packets that are generated by one or more applications 603 operating on host device 602. Specifically, L2CAP may segment data packets of arbitrary size, as output by the application(s) 603, into packets of the size and format that can be processed by Link Layer 630. L2CAP may also perform error detection operations. The protocol stack 640 may also include generic access profile (GAP) and generic attribute profile (GATT). GAP may specify how wireless device 604 advertises itself on the wireless network, discovers other network devices, and establishes wireless links with the discovered devices. GATT may specify how a data exchange between communicating wireless devices is to occur once the connection between the two devices is established. The protocol stack 640 may further include a security manager (SM) that controls how pairing, signing, and encryption of data is performed. GATT may use attribute protocol (ATT) that specifies how units of data are transferred between devices. Wireless device 604 may also include other components not explicitly shown in FIG. 6A, such as a host-controller interface.

Wireless device 604 may have a controller 650, which may include one or more processors 652, such as central processing units (CPUs), finite state machines (FSMs), field-programmable gate arrays (FPGAs), application-specific integrated circuits (ASIC), or the like. Processor(s) 652 may also include custom logic and/or programmable logic, or any combinations thereof. In some embodiments, controller 650 may be a single processing device that supports processes associated with data transmission and reception as well as distance (and/or angle) estimation computations. In some implementations, wireless device 604 may have a dedicated processor for distance (and/or angle) estimation computations that is separate from a processor that executes other operations on wireless device 604 (e.g., processes associated with data transmission and reception).

Wireless device 604 may also include a power management unit (PMU) 670, which manages clock/reset and power resources. Wireless device 604 may further include an input/output (I/O) controller 680 to enable communications with other external devices (including non-network devices) and structures. In some implementations, I/O controller 680 may enable a general purpose I/O (GPIO) interface, a USB interface, a serial digital interface (SDI), a PCM digital audio module, a universal asynchronous receiver transmitter (UART), $I^2C$, $I^2S$, or any other I/O components.

Controller 650 may include a memory 660, which may be (or include) a non-volatile, e.g., read-only (ROM) memory, and/or volatile, e.g., random-access (RAM), memory. Memory 660 may store codes and supporting data for an object localization engine 662, a spatial characteristics engine 664, a tone selection engine 666, and other suitable engines. In some implementations, any one or more of the engines may be located on host device 602, as indicated with the respective dashed boxes in FIG. 6A. The engines may be operating in conjunction with a domain-specific application 603, which may be a device or asset tracking application, an indoor navigation application, an authentication application, or any other suitable application. Placement of the engines 662-666 on host device 602 or wireless device 604 may be based on domain-specific criteria as well as on power constraints. In those implementations, where low latency is of high priority, engines 662-666 may be placed on wireless device 604. In other implementations, where reduced power consumption is advantageous, engines 662-666 may be placed on host device 602. In some implementations, some engines (e.g., tone selection engine 666) may be placed on wireless device 604 while other engines (e.g., object localization engine 662 and spatial characteristics engine 664) may be placed on host device 602.

Application 603 may use information about various objects located in the environment of the host device 602/wireless device 604 (which may, in some implementations, be mounted on a single platform or in proximity of each other). Such information may include distances to the objects, directions to the objects, orientations of the objects relative to host device 602/wireless device 604, or any other spatial characteristics data. The data may be provided by the object localization engine 662, which receives and processes distances from (or angles of directions to) the objects, as may be determined by the spatial characteristics engine 664. In some implementations, the spatial characteristics engine 664 provides an expected range of distances to the objects to the tone selection engine 666. The expected range of distances may be dependent on specific application 603 that is supported by operations of wireless device 604. For example, in key fob applications, the range of distances may be up to several meters, in warehouse product tracking applications, the range of distances may be tens of meters or even more. Based on the received range of distances, the tone selection engine 666 may select tones for a given sensing event, which may be tones separated by a uniform frequency increment, e.g. $f_0 + (k-1) \times \Delta f$. The tone selection engine 666 may further specify the total number N of tones to be used, e.g., k=1 . . . . N. In some implementations, the tone selection engine 666 may select tones that maximize the use of the available bandwidth (e.g., BT bandwidth), the tones that maximize the range of detected distances (e.g., closely spaced tones), the tones that maximize the accuracy of detected distances (e.g., widely spaced tones). In some implementations, the tone selection engine 666 may select tones randomly, or according to any predefined pattern.

Selected tones may be provided to protocol stack 640 (and link layer 630 and PHY 620) that may cause radio 610 to generate signals at the selected tones and transmit the generated signals to the outside environment. Radio 610 may then receive the reflected (returned) signals from various objects (other wireless devices) of the environment and determine phase shifts experienced by the reflected signals, e.g., by comparing the phase information carried by the reflected signals with phase information of the local oscillator copies of the transmitted signals. Radio 610 may further determine amplitudes of the reflected signals. The amplitude and phase information may be provided to the spatial characteristics engine 664 (e.g., in the form of sensing values), which computes the covariance matrix. The spatial characteristics engine 664 may include the covariance matrix optimizer 110 (depicted in FIG. 1), which performs optimized computation of spatial characteristics as described in relation to FIGS. 2-5 above. The spatial characteristics engine 664 provides computed spatial characteristics (e.g., distances and/or angles) to object localization engine 662 that may determine location of various objects at the present instance of time and may further track motion of the object with time, e.g., using a Kalman filter or any other suitable techniques.

Figure 6B:
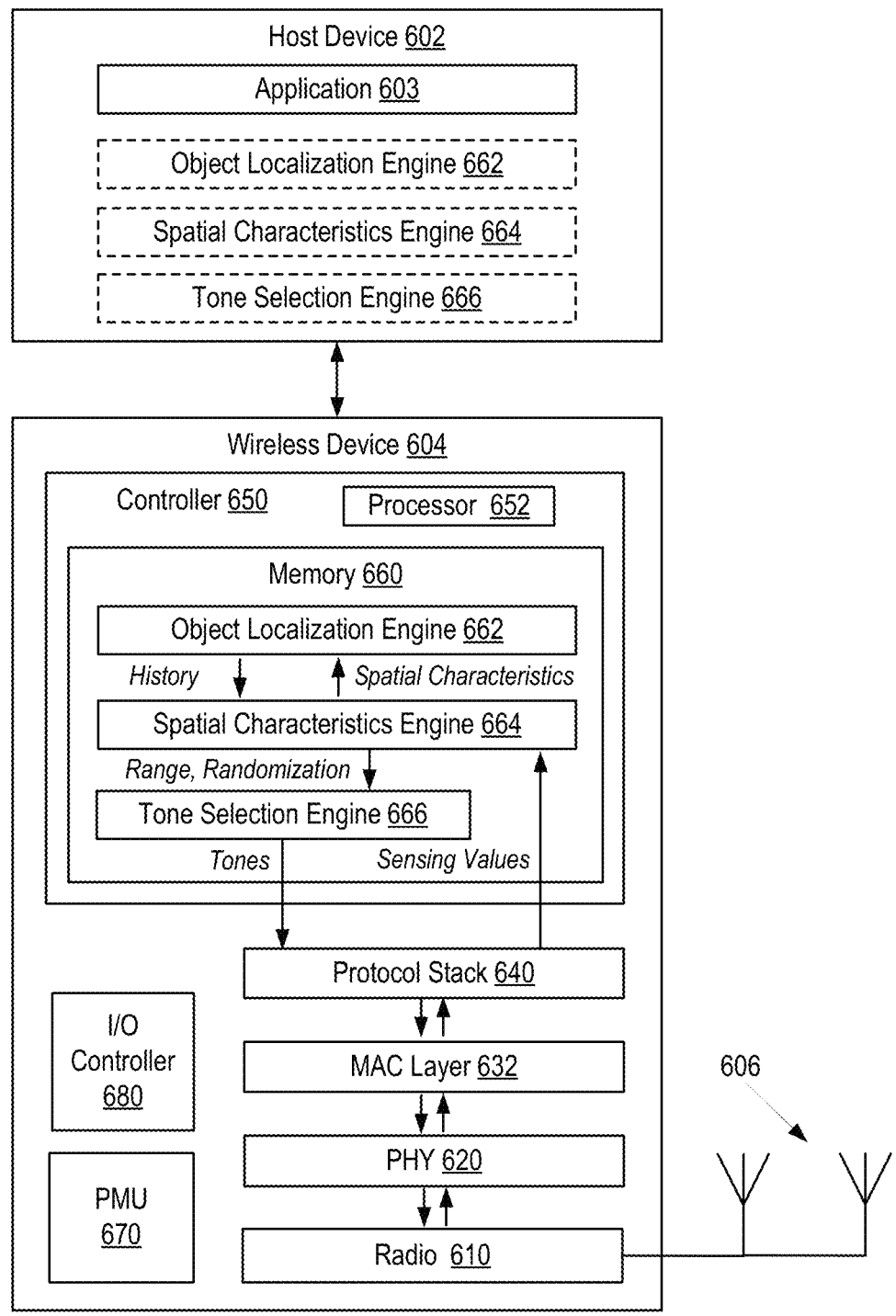
FIG. 6B illustrates one example implementation of a wireless system capable of supporting efficient estimation of spatial characteristics of an environment for fast and precise localization of objects, in accordance with some implementations FIG. 7 a flow diagram of an example method of efficient estimation of spatial characteristics of an environment for fast and precise localization of objects, in accordance with some implementations.

FIG. 6B illustrates one exemplary implementation of a wireless system 600 capable of supporting efficient estimation of spatial characteristics of an environment for fast and precise localization of objects, in accordance with some implementations. Although the wireless system 600 has been described above in conjunction with BT/BLE implementations, similar systems may be used in conjunction with any WLAN (e.g., Wi-Fi) implementations. In a WLAN wireless system 601, an appropriate wireless media access control (MAC) layer 632 may be used instead of the link layer 630 in addition to a WLAN-specific PHY layer 620 and a protocol stack 640. In Wi-Fi, and other WLAN systems, sensing tones may be transmitted in a single packet.

Figure 7:
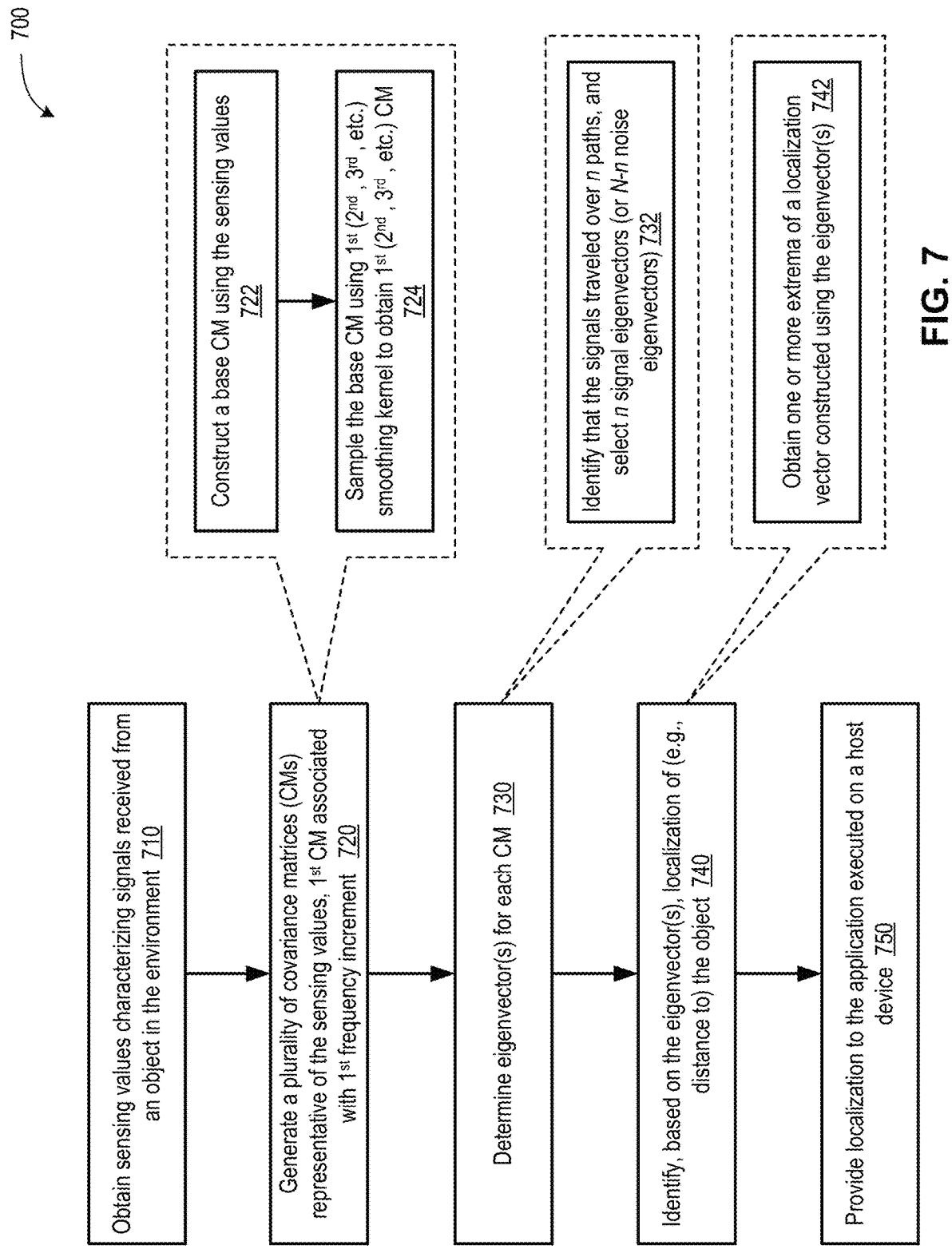

FIG. 7 a flow diagram of an example method 700 of efficient estimation of spatial characteristics of an environment for fast and precise localization of objects, in accordance with some implementations. Method 700 may be performed to identify distance from and/or angles of directions to one or more objects in the outside environment. Method 700 may be performed by a BT wireless device or a BLE wireless device, or any other suitable wireless device or apparatus. The wireless device may also include a radio configured to transmit a plurality of Bluetooth or Bluetooth Low Energy sensing radio waves, e.g., using one or more antennas. Method 700 may be performed by a wireless controller of the wireless device, e.g., controller 650 of FIG. 6. The controller may include a memory (e.g., memory 660) and a processing device (e.g., processor 652) communicatively coupled to the memory. The processing device may include hardware (e.g., circuitry, dedicated logic, programmable logic, microcode, etc.), firmware, and/or software, or any combination thereof. The controller 650 may receive data from radio 610, PHY 620, and other components/modules. In some implementations, the processing device performing method 700 may execute instructions of tone selection engine 666. In certain implementations, method 700 may be performed by a single processing thread. Alternatively, method 700 may be performed by two or more processing threads, each thread executing one or more individual functions, routines, subroutines, or operations of the corresponding method. The processing threads implementing method 700 may be synchronized (e.g., using semaphores, critical sections, and/or other thread synchronization mechanisms). Alternatively, the processing threads implementing method 700 may be executed asynchronously with respect to each other. Various operations of method 700 may be performed in a different order compared with the order shown in FIG. 7. Some operations of method 700 may be performed concurrently with other operations. Some operations may be optional.

At block 710, method 700 may include obtaining a set of sensing values, e.g., $\{r_j\}$. Each sensing value $r_j$ (j=1 . . . . N) of the set of sensing values may characterize a signal of a set of signals received by the wireless device. Each signal of the set of signals may represent a combination of radio waves received from an object (return device) located in an environment of the wireless device. In some implementations, each of the radio waves received from an object may be generated responsive to reception, by the object, of a corresponding sensing radio wave transmitted by the wireless device.

At block 720, the processing device may generate a plurality of covariance matrices (CMs). Each of the plurality of CMs may be representative of at least a subset of the set of obtained sensing values $r_j$. In some implementations, each of the plurality of CMs may be a smoothed matrix. In some implementations, a first CM of the plurality of CMs may be associated with a first frequency increment (e.g., $\Delta f$) for the set of signals. Similarly, a second (third, etc.) CM of the plurality of CMs may be associated with a second frequency increment for the set of signals, which may be a multiple of the first frequency increment (e.g., $2\Delta f$, $3\Delta f$, $4\Delta f$, etc.). It should be understood that the terms "first" and "second" are mere identifiers and do not presuppose any temporal or logical order. For example, a subset of the sensing values that is used to construct the first CM can be obtained (or selected) after a subset of sensing values that is used to construct the first CM is obtained (or selected).

As illustrated by the top callout portion in FIG. 7, the plurality of CMs may be generated using a number of operations. At block 722, the processing device may construct a base CM using the set of sensing values (e.g., using all obtained sensing values $r_j$). At block 724, the processing device may obtain the plurality of CMs from the common CM, e.g., by sampling the elements of the common CM. More specifically, the first CM may be obtained by applying a first smoothing kernel to the common CM. The first smoothing kernel may sample contiguous elements of the common CM. A second CM may be obtained by applying a second smoothing kernel to the common CM. The second smoothing kernel may samples non-contiguous elements of the common CM.

At block 730, method 700 may continue with the processing device determining one or more eigenvectors for each of the plurality of CMs. In some implementations, the processing device may determine all eigenvectors and then select a certain subset of eigenvectors, e.g., a subset of signal eigenvectors or noise eigenvectors. For example, as illustrated with block 732, determining the one or more eigenvectors for a first CM (or any other CM) of the plurality of CMs may include identifying that the set of signals received from the object traveled over n paths, and selecting n signal eigenvectors for the first CM, e.g., as described above in conjunction with FIG. 5A and FIG. 5B. In some implementations, N-n noise eigenvectors may be selected.

At block 740, method 700 may include identifying, based on the determined eigenvectors, one or more spatial characteristics of the object. The spatial characteristics of the object may include localization of the object, such as a distance to the first object (e.g., d), direction to the first object (e.g., θ) etc. In some implementations, determination of the spatial characteristics of the object may be performed concurrently with determination of the spatial characteristics of other objects. As illustrated by block 742, identifying the localization of the object (or any other additional objects) may include obtaining one more extrema of the localization vector (e.g., P(d}) constructed using the one or more determined eigenvectors for each of the plurality of CMs. The obtained extrema (e.g., maxima) of the localization vector may correspond to lengths $d_1, d_2, \ldots$ of different paths to (and from) the object (return device). The shortest path may be the line-of-sight path corresponding to the shortest distance to the object.

At block 750, method 700 may include providing the identified localization of (e.g., distance to) the object to the application executed on the host device. For example, the wireless device may provide determined path lengths $d_1, d_2$, etc., and the host device may use the provided distances to track the object, authenticate the objects, and the like.

It should be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

The implementations of methods, hardware, software, firmware or code set forth above may be implemented via instructions or code stored on a machine-accessible, machine readable, computer accessible, or computer readable medium which are executable by a processing element. "Memory" includes any mechanism that provides (i.e., stores and/or transmits) information in a form readable by a machine, such as a computer or electronic system. For example, "memory" includes random-access memory (RAM), such as static RAM (SRAM) or dynamic RAM (DRAM); ROM; magnetic or optical storage medium; flash memory devices; electrical storage devices; optical storage devices; acoustical storage devices, and any type of tangible machine-readable medium suitable for storing or transmitting electronic instructions or information in a form readable by a machine (e.g., a computer).

Reference throughout this specification to "one implementation" or "an implementation" means that a particular feature, structure, or characteristic described in connection with the implementation is included in at least one implementation of the disclosure. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

In the foregoing specification, a detailed description has been given with reference to specific exemplary implementations. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of implementation, implementation, and/or other exemplarily language does not necessarily refer to the same implementation or the same example, but may refer to different and distinct implementations, as well as potentially the same implementation.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Also, the terms "first," "second," "third," "fourth," etc. as used herein are meant as labels to distinguish among different elements and may not necessarily have an ordinal meaning according to their numerical designation.

What is claimed is:

1. A method comprising:
    obtaining, by a wireless device, a set of sensing values, each of the sensing values characterizing a signal of a set of signals received from an object located in an environment of the wireless device;
    generating a plurality of covariance matrices (CMs), wherein each of the plurality of CMs is representative of at least a subset of the set of sensing values, and wherein a first CM of the plurality of CMs is associated with a first frequency increment of the set of signals;
    determining one or more eigenvectors for each of the plurality of CMs; and
    identifying, based on the determined eigenvectors, localization of the object in the environment of the wireless device.

2. The method of claim 1, wherein a second CM of the plurality of CMs is associated with a second frequency increment of the set of signals.

3. The method of claim 2, wherein the second frequency increment is a multiple of the first frequency increment.

4. The method of claim 1, wherein the plurality of CMs are obtained from a common CM, wherein the first CM is obtained by applying a first smoothing kernel to the common CM, and wherein the first smoothing kernel samples contiguous elements of the common CM.

5. The method of claim 4, wherein a second CM of the plurality of CMs is obtained by applying a second smoothing kernel to the common CM, and wherein the second smoothing kernel samples non-contiguous elements of the common CM.

6. The method of claim 1, wherein identifying localization of the object comprises estimating a distance to the object.

7. The method of claim 1, wherein identifying localization of the object comprises obtaining one or more extrema of a localization vector constructed using the one or more determined eigenvectors for each of the plurality of CMs.

8. The method of claim 1, wherein determining the one or more eigenvectors for a first CM of the plurality of CMs comprises:
identifying that the set of signals received from the object traveled over n paths;
wherein the one or more eigenvectors comprise n signal eigenvectors for the first CM of the plurality of CMs.

9. The method of claim 1, wherein each signal of the set of signals received from the object is generated responsive to reception, by the object, of a corresponding sensing signal transmitted by the wireless device.

10. The method of claim 9, wherein the wireless device is at least one of a Bluetooth device, a Bluetooth Low Energy wireless device, and a Wi-Fi wireless device.

11. An apparatus comprising:
a radio configured to transmit a plurality of Bluetooth, Bluetooth Low Energy, or Wi-Fi sensing radio waves;
a memory; and
a processing device coupled to the memory, the processing device configured to:
obtain a set of sensing values, each of the set of sensing values characterizing a signal of a set of signals received by the radio, wherein each signal of the set of signals represents a combination of radio waves received from an object in an outside environment;
generate a plurality of covariance matrices (CMs), wherein each of the plurality of CMs is representative of at least a subset of the set of obtained sensing values, and wherein a first CM of the plurality of CMs is associated with a first frequency increment of the set of signals;
determine one or more eigenvectors for each of the plurality of CMs; and
identify, based on the determined eigenvectors, localization of the object in the outside environment.

12. The apparatus of claim 11, wherein a second CM of the plurality of CMs is associated with a second frequency increment of the set of signals, the second frequency increment being a multiple of the first frequency increment.

13. The apparatus of claim 11, wherein the plurality of CMs are obtained from a common CM, wherein the first CM is obtained by applying a first smoothing kernel to the common CM, wherein the first smoothing kernel samples contiguous elements of the common CM, wherein a second CM of the plurality of CMs is obtained by applying a second smoothing kernel to the common CM, and wherein the second smoothing kernel samples non-contiguous elements of the common CM.

14. The apparatus of claim 11, wherein the localization of the object comprises an estimate of a distance to the object.

15. The apparatus of claim 11, wherein to identify the localization of the object, the processing device is to obtain one or more extrema of a localization vector constructed using the one or more determined eigenvectors for each of the plurality of CMs.

16. A system comprising:
a host device configured to execute an application; and
a wireless device, communicatively coupled to the host device, the wireless device comprising:
a radio comprising one or more antennas; and
a wireless controller configured to:
obtain a set of sensing values, each of the set of sensing values characterizing a signal of a set of signals received by the radio, wherein each signal of the set of signals represents a combination of radio waves received from an object in an outside environment;
generate a plurality of covariance matrices (CMs), wherein each of the plurality of CMs is representative of at least a subset of the set of obtained sensing values, and wherein a first CM of the plurality of CMs is associated with a first frequency increment of the set of signals;
determine one or more eigenvectors for each of the plurality of CMs;
identify, based on the determined eigenvectors, a localization of the object in the outside environment; and
provide the localization of the object to the application executed on the host device.

17. The system of claim 16, wherein a second CM of the plurality of CMs is associated with a second frequency increment for the set of signals, the second frequency increment being a multiple of the first frequency increment.

18. The system of claim 16, wherein the plurality of CMs are obtained from a common CM, wherein the first CM is obtained by applying a first smoothing kernel to the common CM, wherein the first smoothing kernel samples contiguous elements of the common CM, wherein a second CM of the plurality of CMs is obtained by applying a second smoothing kernel to the common CM, and wherein the second smoothing kernel samples non-contiguous elements of the common CM.

19. The system of claim 16, wherein the localization of the object comprises an estimate of a distance to the object.

20. The system of claim 16, wherein to identify the localization of the object, the wireless controller is to obtain one or more extrema of a localization vector constructed using the one or more determined eigenvectors for each of the plurality of CMs.

* * * * *